(12) United States Patent
Bauer et al.

(10) Patent No.: US 7,173,809 B2
(45) Date of Patent: Feb. 6, 2007

(54) MULTIPHASE BUSBAR SYSTEM

(75) Inventors: Markus Bauer, Weiden (DE); Georg Bollinger, Neunburg V. Wald (DE); Wolfgang Brandl, Amberg (DE); Georg Edenharter, Rieden (DE); Peter Hartinger, Bodenwöhr (DE); Stefan Merz, Heroldsbach (DE); Klaus Reisky, Schwandorf (DE); Norbert Sörgel, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 318 days.

(21) Appl. No.: 10/495,576

(22) PCT Filed: Nov. 8, 2002

(86) PCT No.: PCT/DE02/04151

§ 371 (c)(1),
(2), (4) Date: May 14, 2004

(87) PCT Pub. No.: WO03/047059

PCT Pub. Date: Jun. 5, 2003

(65) Prior Publication Data

US 2005/0013074 A1    Jan. 20, 2005

(30) Foreign Application Priority Data

Nov. 15, 2001    (DE) ................ 101 56 214

(51) Int. Cl.
H02B 1/20     (2006.01)
H02B 1/26     (2006.01)
H01R 31/08    (2006.01)

(52) U.S. Cl. .................. 361/611; 361/622; 439/512; 439/928

(58) Field of Classification Search ............... 361/611, 361/622; 439/507, 512, 513, 928
See application file for complete search history.

(56) References Cited

U.S. PATENT DOCUMENTS

| | | | | |
|---|---|---|---|---|
| 2,912,603 A * | 11/1959 | Farnsworth | ................ | 307/147 |
| 4,883,430 A * | 11/1989 | Siemon et al. | ............. | 439/510 |
| 4,940,431 A * | 7/1990 | Hennemann | ................ | 439/716 |
| 5,024,627 A * | 6/1991 | Bennett et al. | ............ | 439/631 |
| 5,743,768 A * | 4/1998 | Hohorst et al. | ............ | 439/723 |
| 5,816,867 A * | 10/1998 | Davidsz et al. | ............ | 439/828 |
| 5,949,641 A * | 9/1999 | Walker et al. | ............. | 361/600 |
| 6,402,548 B1 * | 6/2002 | Ruiz et al. | .................. | 439/507 |
| 6,452,785 B1 * | 9/2002 | Kaaden et al. | ............. | 361/622 |
| 6,806,424 B2 * | 10/2004 | Gerving | ....................... | 174/59 |

FOREIGN PATENT DOCUMENTS

| | | |
|---|---|---|
| DE | 78 29 012 U1 | 12/1979 |
| DE | 0 063 970 A1 | 11/1982 |
| DE | 0 063 970 B1 | 11/1982 |
| DE | 197 48 531 A1 | 5/1999 |
| DE | 38 05 158 A1 | 8/1999 |
| DE | 199 45 817 A1 | 4/2001 |
| EP | 0 063 970 A1 | 11/1982 |

* cited by examiner

Primary Examiner—Michael Datskovsky
Assistant Examiner—Robert J. Hoffberg
(74) Attorney, Agent, or Firm—Harness, Dickey & Pierce

(57) ABSTRACT

According to the invention, the busbar system comprises at least one first (2) and one second busbar block (3) with busbars (6), whereby the busbars (6) of the first busbar block (2) are electrically connected to a number of supply terminals (5) mounted in a fixed manner thereon and to the busbars (6) of the second busbar block (3) by means of a multiphase connecting plug (4).

17 Claims, 3 Drawing Sheets

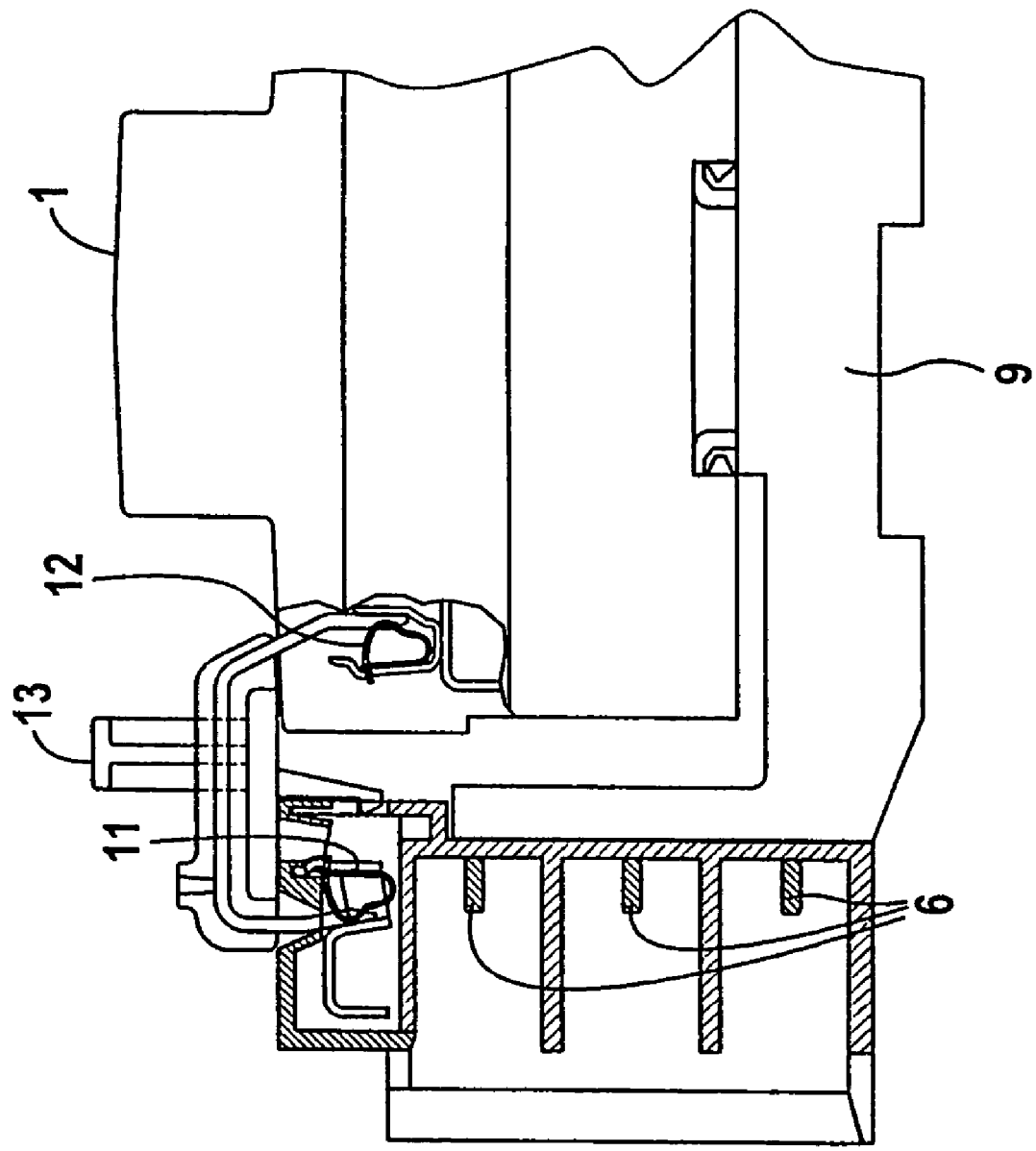
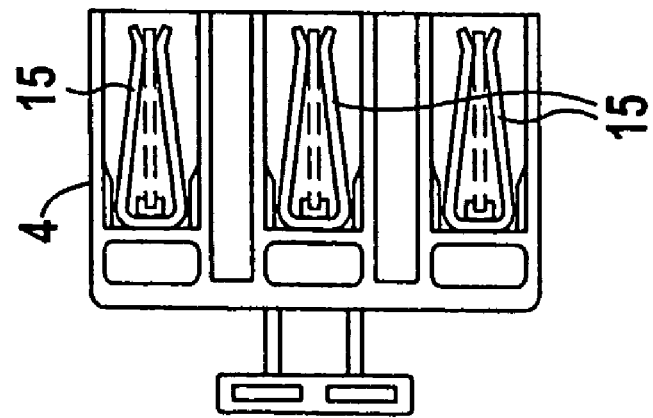
FIG 3

MULTIPHASE BUSBAR SYSTEM

This application is the national phase under 35 U.S.C. § 371 of PCT International Application No. PCT/DE02/04151 which has an International filing date of Nov. 8, 2002, which designated the United States of America and which claims priority on German Patent Application number DE 101 56 214.4 filed Nov. 15, 2001, the entire contents of which is hereby incorporated herein by reference.

FIELD OF THE INVENTION

The invention generally relates to a polyphase or multiphase busbar system for supplying power to two or more switching devices.

BACKGROUND OF THE INVENTION

Until now, a terminal strip has been used as a separate supply terminal for supplying power via a busbar system in the case of power breakers having cage clamp spring terminal connections. The power is supplied by lines from the terminal strip to a busbar system to which the individual power breakers or switching devices are connected by way of flexible lines. If, for example, four outgoing branches are supplied with power by a busbar system such as this, and four further outgoing branches are to be added in parallel with the same power supply, this is only possible by the power in the busbar being fed via the terminals of the fourth power breaker.

SUMMARY OF THE INVENTION

It is therefore the object of an embodiment of the invention to improve a polyphase or multiphase busbar system such that it can be extended in a simple manner for the purpose of connecting further switching devices.

An object may be achieved by a busbar system having at least one first and one second busbar block, the busbars of the first busbar block being electrically connected to two or more permanently attached supply terminals and, by way of a multipole connecting plug, to the busbars of the second busbar block.

Thus, two or more outgoing branches or switching devices can be supplied with power by only one supply point, the restriction being the total power of the supply terminals at the supply point.

One advantageous development of an embodiment of the invention is provided if a further busbar block is connected to at least one of the free ends of the busbar blocks by way of a further connecting plug.

One further advantageous embodiment is provided if the connecting plug is in the form of a dual lyre-shaped connecting plug having four lyre-shaped contacts per phase, of which two make contact with one of the busbars of the first busbar block and the other two make contact with the opposing busbar of the second busbar block. In this manner, a reliable supply of power is possible with low contact resistance.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention, wherein:

FIG. 3 shows a sectional illustration of the busbar system shown in FIG. 1 in the region of the connection of two busbar blocks.

DETAILED DESCRIPTION OF THE PREFERRED EMBODIMENTS

Figure 1:
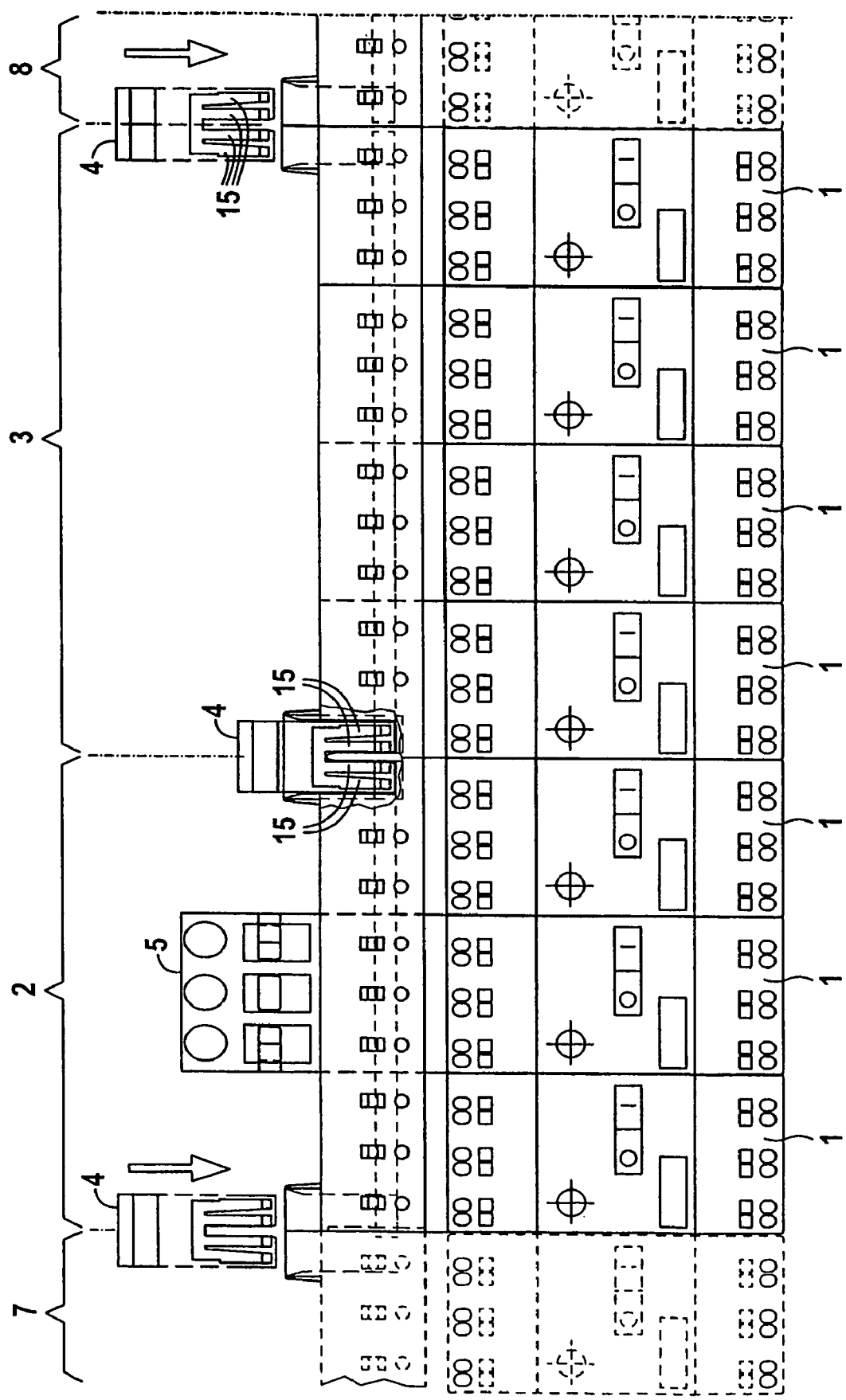
FIG. 1 shows a front view of a polyphase busbar system according to an embodiment of the invention for supplying power to two or more switching devices.

FIG. 1 shows a polyphase busbar system according to an embodiment of the invention for supplying power to switching devices 1. The busbar system has a first polyphase busbar block 2 and a second polyphase busbar block 3, which are each arranged above the switching devices 1 and are electrically connected to one another by a multipole connecting plug 4. A supply point having two or more supply terminals 5 is permanently attached to the busbar block 2, i.e. there is only a low non-reactive resistance between each busbar 6 of the busbar block 2 and the associated supply terminal 5. As a result, there are only small contact current losses during operation.

The multipole connecting plug 4 is in the form of a dual lyre-shaped connecting plug having four lyre-shaped contacts 15 per phase which are electrically connected to one another. Two of the lyre-shaped contacts 15 make contact with one of the busbars 6 of the first busbar block 2, the other two make contact with the opposing busbar of the second busbar block 3. Further busbar blocks 7, 8 can be connected to the free ends of the two busbar blocks 2, 3, as shown in FIG. 1, using multipole connecting plugs 4. The number of possible switching devices 1 is in this case restricted by the total permissible power for which the supply point of the busbar system is dimensioned.

Figure 2:
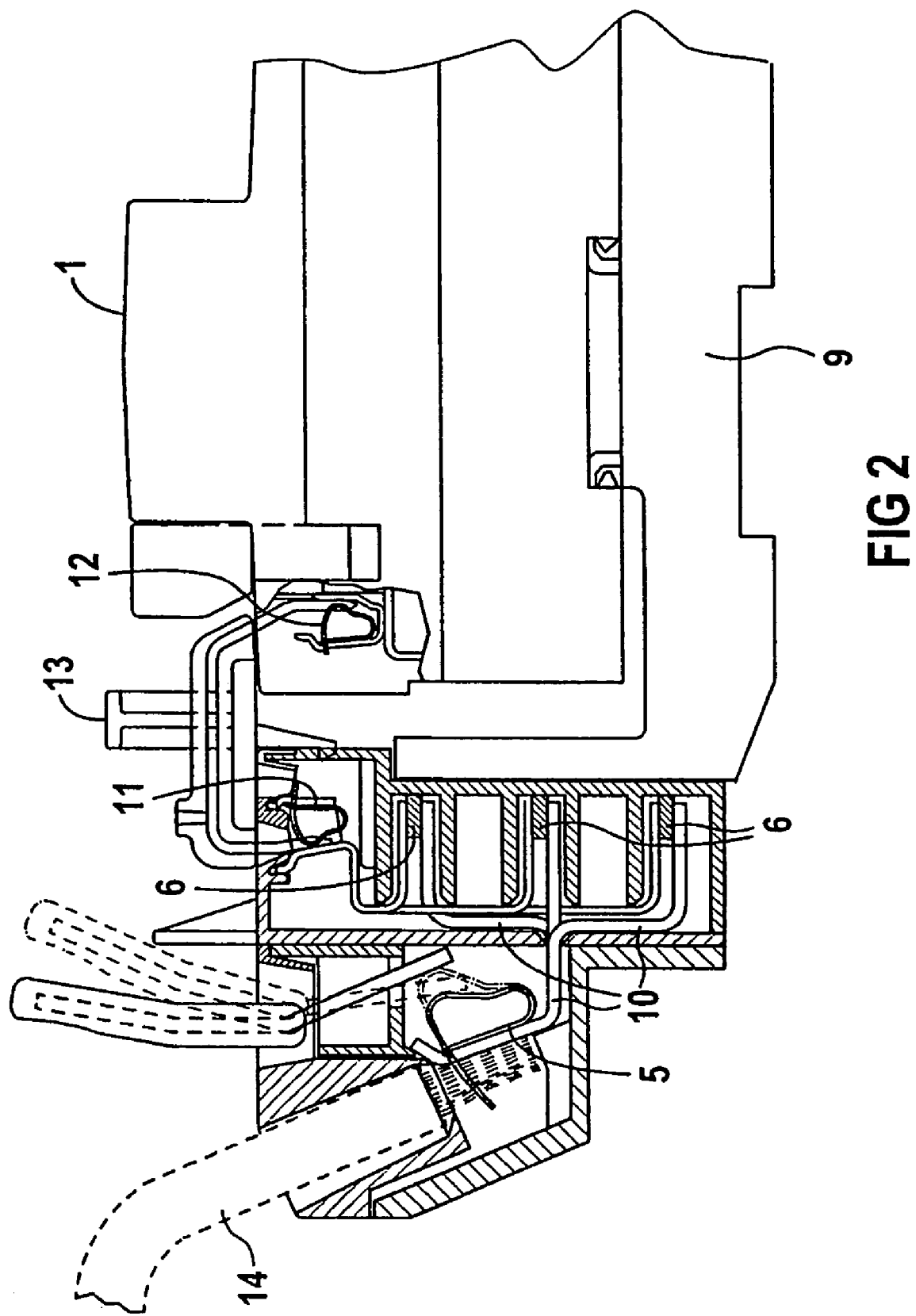
FIG. 2 shows a sectional illustration through the busbar system shown in FIG. 1 in the region of the supply point.

FIG. 2 shows, in cross section, the busbar block 2 and a switching device 1 in the region of the supply terminals 5. The busbar block 2 having the three busbars 6 and the permanently attached supply terminals 5 are retained by a fixing block 9. In accordance with FIG. 1, three switching devices 1 are snapped onto the fixing block 9 associated with the busbar block 2 using top-hat rails as the fixing device, only one of these three switching devices 1 being visible in FIG. 2 owing to the sectional illustration.

There is in each case one continuous, electrically conductive connection 10 from the busbars 6 to the respective supply terminals 5, on the one hand. Further, on the other hand, there are connections from the busbars 6 to connections 11 within the busbar block 2, which serve the purpose of making the electrical connection with the connections 12 of the switching device 1. The supply terminals 5 and the connections 11, 12 are all in the form of cage clamp spring terminals.

However, it is also possible to use screw connections for the switching devices 1. In this case, the three-pole electrical connection to the switching device usually makes use of individual conductors. When dismantling a switching device having screw connections under stress, for reasons of safety the line to the busbar must first be detached using an insulated screwdriver.

The electrical connection between the connections 11 and 12 is made by way of a further connecting plug 13 using a simple plug connection. The cage clamp spring terminals 5 are used to supply power from the outside via the branch lines 14.

FIG. 3 shows the busbar system shown in FIG. 1 in the region of the connection of the two busbar blocks 2 and 3. In FIG. 3, the components already known from FIG. 2 have the reference numerals used in FIG. 2. In order to avoid repetition, only the differences from the illustration shown in FIG. 2 are described below. Accordingly, the connecting plug 4 having the lyre-shaped contacts 15 is provided for each of the busbars 6, as described above, for the electrical connection of the two busbar blocks 2, 3.

When providing busbar blocks with and without supply terminals it is possible to connect up any desired number of outgoing branches or switching devices 1.

Simple Example 4 outgoing branches having a power of 4 kW; required is:
   1× a block of 4 busbars with a supply terminal Extreme Example 18 outgoing branches having a power of 1.5 kw; required are:
   1× a block of 4 busbars with a supply terminal
   2× a block of 4 busbars without a supply terminal
   2× a block of 3 busbars without a supply terminal
   4× connecting plugs with dual lyre-shaped contacts.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A polyphase busbar system, adapted to supply power to at least two switching devices, comprising:
   at least one first and one second busbar block, each including busbars, the busbars of the first busbar block being electrically connected to at least two permanently attached supply terminals and being connected, via a multipole connecting plug, to the busbars of the second busbar block.

2. The polyphase busbar system as claimed in claim 1, further comprising:
   a further busbar block, connected to at least one of the free ends of at least one of the first and second busbar blocks via a further connecting plug.

3. The polyphase busbar system as claimed in claim 2, wherein the connecting plug is in the form of a dual lyre-shaped connecting plug including at least four lyre-shaped contacts per phase, of which two make contact with one of the busbars of the first busbar block and the other two make contact with the opposing busbar of the second busbar block.

4. The polyphase busbar system as claimed in claim 3, wherein the further connecting plug is in the form of a dual lyre-shaped connecting plug including at least four lyre-shaped contacts per phase.

5. The polyphase busbar system as claimed in claim 2, wherein the further connecting plug is in the form of a dual lyre-shaped connecting plug including at least four lyre-shaped contacts per phase.

6. The polyphase busbar system as claimed in claim 2, wherein the first and second busbar blocks are each retained by a fixing block, acting as a mechanical adapter for the at least two switching devices.

7. The polyphase busbar system as claimed in claim 1, wherein the connecting plug is in the form of a dual lyre-shaped connecting plug including at least four lyre-shaped contacts per phase, of which two make contact with one of the busbars of the first busbar block and the other two make contact with the opposing busbar of the second busbar block.

8. The polyphase busbar system as claimed in claim 7, wherein the first and second busbar blocks are each retained by a fixing block, acting as a mechanical adapter for the at least two switching devices.

9. The polyphase busbar system as claimed in claim 1, wherein the first and second busbar blocks are each retained by a fixing block, acting as a mechanical adapter for the at least two switching devices.

10. The polyphase busbar system as claimed in claim 1, wherein the supply terminals are in the form of cage clamp spring terminals.

11. The polyphase busbar system as claimed in claim 1, wherein the busbar blocks include connections, in the form of cage clamp spring terminals used for making the electrical connection with connections of the switching devices.

12. A multiphase phase busbar system, adapted to supply power to at least two switching devices, comprising:
   at least one first busbar block including busbars;
   at least one second busbar block including busbars; and
   connecting means for electrically connecting the busbars of the first busbar block to the busbars of the second busbar block, the busbars of the first busbar block further being electrically connected to at least two supply terminals of the at least two switching devices,
   wherein the connecting means includes a multipole connecting plug.

13. The multiphase busbar system as claimed in claim 12, further comprising:
   a further busbar block; and
   means for connecting the further busbar block to at least one of the free ends of at least one of the first and second busbar blocks.

14. The multiphase busbar system as claimed in claim 12, wherein the connecting means includes a dual lyre-shaped connecting plug including at least four lyre-shaped contacts per phase, of which two make contact with one of the busbars of the first busbar block and the other two make contact with the opposing busbar of the second busbar block.

15. The polyphase busbar system as claimed in claim 12, wherein the first and second busbar blocks are each retained by a fixing block, acting as a mechanical adapter for the at least two switching devices.

16. The polyphase busbar system as claimed in claim 12, wherein the supply terminals are in the form of cage clamp spring terminals.

17. The polyphase busbar system as claimed in claim 12, wherein the busbar blocks include connections, in the form of cage clamp spring terminals used for making the electrical connection with connections of the switching devices.

* * * * *